3,421,911
PLASTICIZER FOR SULFUR ROAD MARKING MATERIAL

Carl C. Greco, Bronx, N.Y., and Stanley B. Mirviss, Stamford, Conn., assignors to Stauffer Chemical Company, New York, N.Y., a corporation of Delaware
No Drawing. Filed Aug. 22, 1966, Ser. No. 573,864
U.S. Cl. 106—19   8 Claims
Int. Cl. C09d *11/00*

ABSTRACT OF THE DISCLOSURE

Plasticized sulfur road-marking compositions are prepared by reacting a major amount of elemental sulfur and a minor amount of diacyl disubstituted glycol polysulfide plasticizer.

---

This invention relates to plasticized sulfur compositions particularly suited for marking roads, highways and the like, which are characterized by having high impact resistance in addition to good hardness and color properties. More specifically, this invention is concerned with plasticized sulfur compositions which are prepared by reacting a major amount of elemental sulfur and a minor amount of diacyl disubstituted glycol polysulfide plasticizer.

Considerable research has been conducted for the provision of sulfur compositions because they are generally inexpensive and resistant to attack by acids, penetration by roots, as well as resistant to the action of lubricating oils or gasoline. Accordingly, such compositions have been found useful for jointing brick, sewer pipe, segmental tile and sewer brick. Sulfur compositions have also found use as road marking materials because of their inherent strength, flexibility and resiliency. Despite the considerable market potential for successful plasticized sulfur roadmarking compositions, suitable plasticizers have been mainly limited to the alyklene polysulfides and particularly the polyethylene tri- and tetrasulfides. As a result of this, large market potential and limited supply of acceptable plasticized sulfur compositions for road marking, it can be safely stated there is a need for other acceptable compositions to be discovered and, accordingly, it is the primary object of this invention to provide sulfur compositions suitable for marking roads, highways and other paved surfaces.

It is another object of this invention to provide plasticized sulfur compositions which are suitable for marking roads, highways, and other paved surfaces which compositions are resistant to cracking by impact.

Other objects will be apparent from the description which follows.

The polysulfide plasticizers utilized in our invention may be represented by the following general formula:

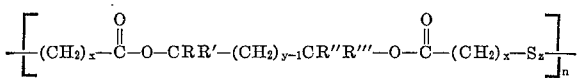

wherein $x$ is an integer of from 1 to 3 inclusive, R, R', R" and R'" are 1 to 3 carbon alkyl or hydrogen, $y$ is an integer of from 1 to 5 inclusive, $z$ is an integer of from 2 to 6 inclusive, and $n$ is an integer of from about 2 to about 100.

The above polysulfides are reacted with sulfur to plasticize the same in a polysulfide-sulfur weight ratio of from 1:99 to 1:1 and preferably from about 3:97 to 1:3. It is desirable to add a small amount of an alkaline material to aid in combining the reactants but none is required. A variety of bases may be used, such as the alkali metal and alkaline earth metal carbonates and organic primary, secondary and tertiary amines. Only a small amount is used; generally less than 1.5% by weight of the final composition is sufficient.

To prepare the plasticized compositions, the sulfur can be first melted and then any fillers, dyes and pigments added with the polysulfide, but the order of addition is not critical and the materials can be dry-mixed prior to heating. Suitable inert fillers include silicates, carbonates, sulfates, metal oxides, clays, diatomaceous earth, wood flours, volcanic ash, pumice, glass beads (20- to 50-mesh), and the like which impart strength to the compositions as well as improve night visibility in the case of the glass beads. In preparing the compositions of the invention, the sulfur may be heated until in the molten state, i.e., from about 118° C. to about 250° C. It is preferred to maintain the temperature of the reaction mixture at about 150° C. since pure sulfur becomes viscous at 160° C. and higher temperatures are unnecessary. Since the compositions of the invention may be used in different applications, as well as in different geographical locations and under varying use conditions, the most suitable sulfur to plasticizer ratio must be determined experimentally for optimum provision of properties under the climatic conditions for a given area.

Various whiteners or pigments may be blended with the compositions when a color is desired and one particularly effective pigment is titanium dioxide. Two excellent yellow pigments are Hansa Yellow (the coupling product between diazotized p-nitroaniline and acetoacetanilide), and toluidine Yellow (the coupling product between diazotized m-nitro-p-toluidine and acetoacetanilide).

To protect the marking against bacterial attack that might result in deterioration and loss of bond to the pavement, a minor amount of a bactericide such as o-benzyl-p-chlorophenol, pentachlorophenol, or sodium pentachlorophenate may be added to the melt.

The paved surface, to which the plasticized melt is to be applied, should be swept free of any dirt and preferably washed. The melt may then be applied by an applicator of the type used for applying paint, which has been adapted to permit maintaining the temperature of the melt at about 140° C. A stripe may eeasily be laid in any desired thickness and will set in a fraction of the time required for traffic paints.

The polysulfide plasticizers of the invention are prepared by the interfacial polycondensation of a dihalo-substituted diacylated glycol with an aqueous sodium polysulfide solution. A freshly precipitated magnesium hydroxide dispersion is used as a nucleating agent and, if desired, a dispering agent of the alkyl-aryl sulfonate type. The polysulfide is then recovered from the dispersion by acidification to a pH between 4 and 5, which causes the dispersion to coagulate as a rubbery material.

Some representative examples of dihalides which may be utilized in the reaction include the following: ethylene bis(chloroacetate), ethylene bis(3-chloropropionate), ethylene bis(4-chlorobutyrate), 1,2-propane bis(chloroacetate), 1,3-propane bis(chloroacetate), and 2-methyl-2,4-pentane bis(chloroacetate).

Examples of suitable polysulfides for reaction with the dihalide include: sodium disulfide, sodium trisulfide, sodium tetrasulfide and sodium pentasulfide.

The following examples will serve to illustrate the invention but should not be construed as limiting for obvious modifications will be apparent to one having ordinary skill in the art. All parts and percentages in said examples are on a weight basis.

EXAMPLE 1

To a flask containing 150 cc. of water is added 67.3 gm. (0.28 mole) of sodium sulfide and 27 gm. (0.84 mole) of sulfur. The resultant solution is gradually heated to a temperature of 90° C., during which time there is added 8 cc. of 25% $MgCl_2 \cdot 6H_2O$, 2 cc. of 50% sodium hydroxide, and 50 gm. (0.23 mole) of ethylene bis(chloroacetate). The ethylene bis(chloroacetate) addition is made at a temperature of about 85° C. and requires approximately one hour for completion, due to the exothermic reaction. The resultant mixture is then heated for 1½ hours and allowed to cool at room temperature over night. A yellow rubbery material suspended in the water is removed by filtering and washing with 100 cc. of 20% hydrochloric acid. The material is further washed twice with 100 cc. portions of water and then dried. Chemical and instrumental analysis indicate the product to be polyethylene diacetate tetrasulfide, with a molecular weight of 557.

EXAMPLE 2

79 parts of commercial elemental sulfur in the molten state at a temperature of 135° C. is poured into a 250 cc. stainless steel beaker contained in a heating mantel. To this melt is added 20 parts of the reaction product of Example 1, 1 part of calcium carbonate and the melt is heated to 150° C., and maintained at this temperature for 30 minutes. The melt is poured into aluminum foil evaporating dishes approximately two inches in diameter and ½ inch high and allowed to cool to room temperature. The solid compositions are then tested for impact strength.

To test for impact strength, two samples of the plasticized compositions are subjected to the Gardner light duty impact tester, which consists of dropping a 1-pound ball on the sample from progressively higher heights until a cracking is noted on the reverse side of the sample. The two plasticized compositions are found to have an impact resistance of 6 inch-pounds. Two unplasticized sulfur compositions heated to 150° C., and maintained at that temperature for 30 minutes are also subjected to this test and found to have an impact resistance of less than 2 inch-pounds.

EXAMPLE 3

According to the procedure of Example 2, 89 parts of elemental sulfur, 10 parts of the reaction product of Example 1, and one part of calcium carbonate are reacted and tested for impact resistance according to the procedure of Example 2. The plasticized composition is found to be resistant to impact.

EXAMPLE 4

To a flask containing 150 cc. of water is added 67.3 gm. (0.28 mole) of sodium sulfide and 27 gm. (0.84 mole) of sulfur. The resultant solution is gradually heated to a temperature of 90° C., during which time there is added 8 cc. of 25% $MgCl_2 \cdot 6H_2O$, 2 cc. of 50% sodium hydroxide, and 52 gm. (0.23 mole) of 1,2-propane bis (chloroacetate). The propane bis(chloroacetate) addition is made at a temperature of about 85° C. and requires approximately one hour for completion, due to the exothermic reaction. The resultant mixture is then heated for 1½ hours and allowed to cool at room temperature over night. A yellow rubbery material suspended in the water is removed by filtering and washing with 100 cc. of 20% hydrochloric acid. The material is further washed twice with 100 cc. portions of water and then dried. The product is identified as poly 1,2-propane diacetate tetrasulfide.

EXAMPLE 5

79 parts of commercial elemental sulfur in the molten state at a temperature of 135° C. is poured into a 250 cc. stainless steel beaker contained in a heating mantel. To this melt is added 20 parts of the reaction product of Example 4, 1 part of calcium carbonate and the melt is heated to 150° C., and maintained at this temperature for 30 minutes. The melt is poured into aluminum foil evaporating dishes approximately two inches in diameter and ½ inch high and allowed to cool at room temperature. The solid compositions are then tested for impact strength according to the procedure of Example 2 and are found resistant to impact.

EXAMPLE 6

To a flask containing 150 cc. of water is added 67.3 gm. (0.28 mole) of sodium sulfide and 9 gm. (0.28 mole) of sulfur. The resultant solution is gradually heated to a temperature of 90° C., during which time there is added 8 cc. of 25% $MgCl_2 \cdot 6H_2O$, 2 cc. of 50% sodium hydroxide, and 62 gm. (0.23 mole) of 2-methyl-2,4-pentane bis(chloroacetate). The 2-methyl-2,4-pentane bis-chloroacetate) addition is made at a temperautre of about 85° C. and requires approximtaely one hour for completion, due to the exothermic reaction. The resultant mixture is then heated for 1½ hours and allowed to cool at room temperature over night. A rubbery material suspended in the water is removed by filtering and washing with 100 cc. of 20% hydrochloric acid. The material is further washed twice with 100 cc. portions of water and then dried. Chemical and instrumental analysis identify the product as poly 2-methyl-2,4-pentane diacetate disulfide.

EXAMPLE 7

According to the procedure of Example 2, 95 parts of elemental sulfur and 5 parts of the reaction product of Example 6 are reacted and tested for impact resistance according to the procedure of Example 2. The plasticized composition is found to be resistant to impact.

We claim:

1. A composition for use in marking paved surfaces comprising the reaction product of sulfur and a polysulfide plasticizer of the formula:

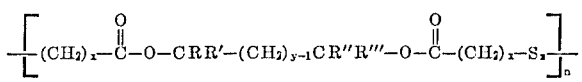

wherein $x$ is an integer of from 1 to 3 inclusive, R, R', R" and R''' are 1 to 3 carbon alkyl or hydrogen, $y$ is an integer of from 1 to 5 inclusive, $z$ is an integer of from 2 to 6 inclusive, and $n$ is an integer of from about 2 to about 100, in a ratio of sulfur to plasticizer of from 99:1 to 2:1 by weight, wherein the sulfur and polysulfide plasticizer are reacted at a temperature between about 118° C. and about 250° C.

2. A composition for use in marking paved surfaces comprising the reaction product of sulfur and a polysulfide plasticizer of the formula:

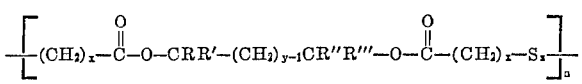

wherein $x$ is an integer of from 1 to 3 inclusive, R, R', R" and R''' are 1 to 3 carbon alkyl or hydrogen, $y$ is an integer of from 1 to 5 inclusive, $z$ is an integer of from 2 to 6 inclusive, $n$ is an integer of from about 2 to about 100, in a ratio of sulfur to plasticizer of from 97:3 to 3:1 by weight, wherein the sulfur and polysulfide plasticizer are reacted at a temperature between about 118° C. and about 150° C.

3. The composition of claim 2 wherein the polysulfide plasticizer is polyethylene diacetate tetrasulfide.

4. The composition of claim 2 wherein the polysulfide plasticizer is poly 1,2-propane diacetate tetrasulfide.

5. The composition of claim 2 wherein the polysulfide plasticizer is poly 2-methyl-2,4-pentane diacetate disulfide.

6. The composition of claim 2, additionally comprising a minor amount of a yellow pigment.

7. The composition of claim 2, additionally comprising a minor amount of a bactericide.

8. The composition of claim 2, additionally comprising from about 1% to about 10% of a filler.

References Cited

UNITED STATES PATENTS

| | | | |
|---|---|---|---|
| 2,676,165 | 4/1954 | Fettes | 260—79 |
| 3,020,252 | 2/1962 | Hancock | 260—30.8 |
| 2,568,034 | 9/1951 | Stewart | 167—20 |

JULIUS FROME, *Primary Examiner.*

THEODORE MORRIS, *Assistant Examiner.*

U.S. Cl. X.R.

106—70, 287; 23—224; 260—125